2,603,905

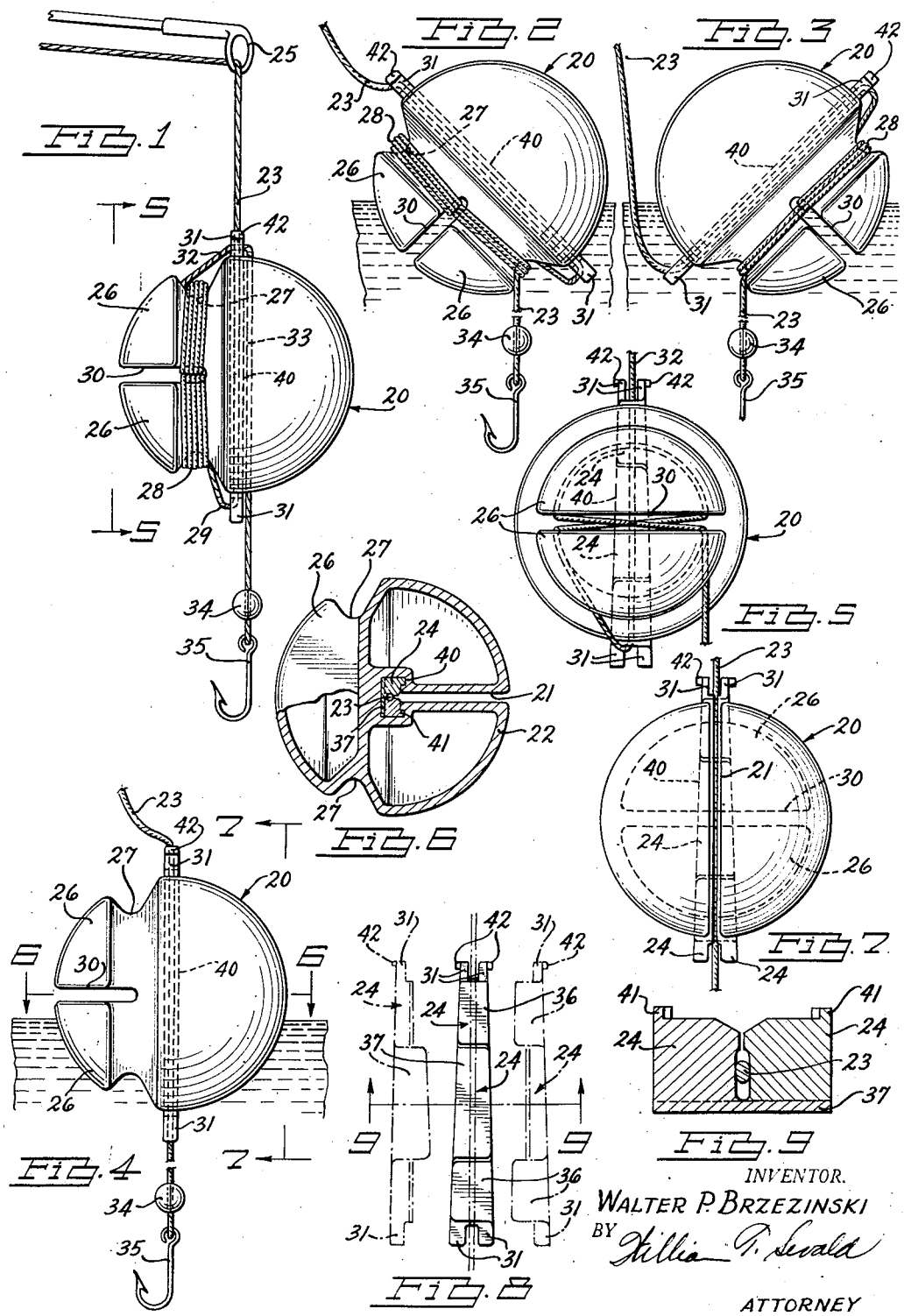
July 22, 1952 — W. P. BRZEZINSKI — 2,603,905
FISHING FLOAT
Filed July 21, 1949
INVENTOR.
WALTER P. BRZEZINSKI
ATTORNEY Patented July 22, 1952

UNITED STATES PATENT OFFICE 2,603,905

FISHING FLOAT

Walter P. Brzezinski, Detroit, Mich.

Application July 21, 1949, Serial No. 105,981

3 Claims. (Cl. 43—43.11)

This invention relates to improvements in floats for fishing lines and in particular to improvements in floats used in conjunction with casting rods and reels for containing an amount of line wound thereon when the cast is made and which automatically unwinds therefrom when the float rests on the water to establish the bait at a predetermined depth in the water.

The primary object of the invention is to provide a float for use in casting to enable the fisherman to cast his bait out on the water at a considerable distance from himself to any desired point so that the float, upon resting on the water, automatically unwinds an amount of line to establish the bait at a desired predetermined depth.

An object of the invention is to provide a substantially spherical float having a channel formed therein leading from the outside thereof to approximately the center thereof for laterally receiving the line from the casting rod substantially at and with an axis of the sphere to axially position the float on the line leading from the casting rod.

An object of the invention is to provide a lateral channel in the float leading from the outside thereof to approximately the center thereof for receiving the line from the coil wound on the float to the bait substantially at and with an axis of the sphere to axially position the line leading from the coil wound on the float to the bait so that this section of the line lies parallel with and closely adjacent to the line leading from the casting rod to the float to maintain the position of the float axially on the line during casting thereby preventing the sinker and bait from tilting the float and unwinding the coil of line on the float prior to and during the casting operation.

An object of the invention is to provide spool, bobbin, or reel in one hemisphere of the spherical float for winding and holding the line thereon prior to and during casting; which line will automatically unwind therefrom upon the float resting on the water.

An object of the invention is to provide a channel in the bobbin, reel or spool extending to the base of the bobbin portion for receiving a portion of the line being wound on the bobbin, reel or spool to facilitate transferring the line to the opposite side of the bobbin, reel, or spool portion to effect reversal of direction in winding the line on the device so that the device will not spin in automatically unwinding the line wound thereon.

Another object of the invention is to provide gripping means for securing the line to the float at a predetermined distance from the bait and sinker.

Another object of the invention is to provide gripping means which are operable to secure the line at a predetermined distance from the bait and sinker which is annexable to the line at any point without threading the line through the float or without removing the sinker and bait or otherwise disturbing the organization of the line.

Other objects of the invention will become apparent by reference to the following detailed description taken in conjunction with the accompanying drawing, in which:

Fig. 1 is an elevational view of the inventive float associated with a fishing line and casting rod in castable condition.

Fig. 2 is an elevational view of the inventive float floating on the surface of a body of water showing how the float tips to unwind the fishing line from its spool portion.

Fig. 3 is an elevational view of the inventive float similar to Fig. 2 with the line leading from the opposite side of the float thereby tilting the float oppositely to the position shown in Fig. 2.

Fig. 4 is a side elevational view of the inventive float resting on the surface of a body of water after the fishing line has unwound from the spool or bobbin portion.

Fig. 5 is a side elevational view of the inventive float as seen in Fig. 1, taken on the line 5—5 thereof.

Fig. 6 is a cross-sectional view of the inventive float taken on the line 6—6 of Fig. 4.

Fig. 7 is a side elevational view of the inventive float taken on the line 7—7 of Fig. 4.

Fig. 8 is a detail view of the line gripping means also showing the component parts in exploded positions in dotted lines; and Fig. 9 is a cross-sectional view of the gripping means taken on the line 9—9 of Fig. 8.

Referring now to the drawings wherein like numerals refer to like and corresponding parts throughout the several views, the particular embodiment of the invention disclosed for the purpose of illustration comprises a buoyant, substantially spherical body 20 having a T-shaped channel 21 extending along an axis of the body 20 and leading outwardly through the peripheral side surface 22 for receiving fishing line 23 laterally therein and for establishing the fishing line 23 axially of the body 20, wedges 24 lying in the head of the T-shaped channel 21 for frictionally gripping the line 23 leading from the casting rod 25 to the body 20, a bobbin or spool portion 26 on the body 20 defined by the substantially annular groove 27 in the body 20's peripheral surface for winding the line 23 thereon in winds 28 as the line 23 leads as at 29 from the bottom portion of the T-shaped channel 21 as the body 20 hangs suspended beneath the pole 25 on the line 23, a channel 30 in the bobbin or spool portion 26 communicating with the groove 27 and laterally extending through the peripheral side surface 22 of the body 20 for laterally receiving the line 23 therein as it is being wound on the bobbin portion 26 for transferring the line 23 from one side of the bobbin portion 26 to the opposite side thereof to effect reversal of direction in the winds 28 on the bobbin portion 26, extension portions 31 on the wedge members 24 to direct the line 23 from the winds 28 at 32 to the T-shaped channel 21 so that the line 23 leads back into the T-shaped channel 21 as at 33 to the sinker 34 and the hook 35 thereby establishing the line 23 leading from the winds 28 to the sinker 35 substantially axially of the body 20 to locate the sinker substantially on the extended axis of the line 23 leading from the rod 25, so that the position of the float body 20 on the line 23 is undisturbed by the sinker 34 and the hook 35.

Referring in more detail to the inventive device, the body 20 comprises two hemispheres, with one hemisphere having the annular groove 27 formed therein defining the spool or bobbin 26 and the channel 30 interrupting the bobbin 26 and communicating with the groove 27; the other hemisphere having the T-shaped channel 21 axially and laterally formed therein at 90 degrees angular variation to the interrupting channel 30 so that the body 20 is not divided by the channels 21 and 30. The wedge members 24 are constructed to extend at either end of the T-shaped channel 21 to provide extension portions 31 at both ends thereof rendering the device universally applicable to the line 23 relative to the rod 25 end of the line for leading the line as at 32 back into the channel 21 from the winds 28. The wedges 24 are equipped with dove-tailing portions 36 and 37 for interlocking the wedges 24 within the head of the T channel 21 as they grip the line 23.

The head of the T channel 21 is tapered from one end to the other as seen in Fig. 7 showing the tapered wedges 24 positioned in the tapered head of the channel 21 which is provided with grooves 40 paralleling the tapered sides, and the wedges are equipped with beads or tongues 41 which slidably rest in the grooves 40 and cause the wedges 24 to travel in a path adjacent the sides of the head of the T channel 21 so that the wedges 24 not only close when pushed into the head of the T channel 21, but also open when pushed out of the T channel 21. The wedges 24 are also equipped with tips 42 for contacting the peripheral surface 22 adjacent the T channel 21 for preventing the wedges 24 from falling out when opened.

The wedges hereinbefore described are the preferred means for annexing the line 23 to the float 20 but the line 23 may be tied in the channel 21 and this form of annexation is considered basic and fundamental.

To prepare the inventive float 20 for casting, the fisherman determines the depth at which he wishes to establish the hook 35 below the float 20 and secures the float 20 on the line 23 at that distance from the hook 35 by loosening the wedges 24, inserting the line 23 laterally of the body 20, and tightening the wedges 24 thereby firmly annexing the float 20 on the line 23 at the desired position. The fisherman then winds the line 23 at the hook 35 end thereof on the bobbin 26, crossing through the channel 30 preferably at each half wind so that the line 23 is wound on the bobbin 26 in the shape of a figure 8, until the sinker 35 is approached, and, at this time, he leads the line 23 from the bobbin 26 between the extension portions 31 into the T channel 21; the float 20, line 23, sinker 34 and hook 35 are, at this point, in the condition illustrated in Fig. 1 and ready to be cast by the fisherman.

After the assembly has been cast, and the float comes to rest on the surface of the water, the sinker 34 pulls on the float 20 via the line 23, and as the float 20 is spherical, the float is rotated to initially position the T channel 21 downwardly so that the line 23 from winds 28 drops out of the T channel 21 and passes the extensions 31 as the float 20 rotates or turns on the surface of the water to place the extensions 31 downwardly. Next, under the action of the sinker 34 via line 23, the bobbin 26 is pulled downwardly and the float rotates to so position the bobbin 26 and then the sinker pulls the line 23 from the bobbin 26 and out of the interrupting channel 30 with the float rotating a half turn in one direction to unreel the line on one side of the bobbin 26 and then rotating a half turn in the other direction to unreel the line from the other half of the bobbin 26, with the line dropping out of the interrupting channel 30 at each half turn of the float 20 with the float 20 tilting from side to side or oscillating as seen in Figs. 2 and 3 but without spinning under the influence of the unwinding or unreeling to lower the hook 35 to the desired depth in the water. When the hook 35 is completely lowered, Fig. 4, the gripping means or wedges 24 sustain the sinker 34 and hook 35 via the line 23 underneath the float 20.

Half turns in the line 23 on the bobbin 26 are recommended but a full turn, or a turn and one-half are possible in winding the line 23 on the bobbin 26 without spinning the float 20 to the extent of snarling in unwinding or unreeling therefrom in lowering the hook 35 and sinker 34.

Although but a single embodiment of the invention has been shown and described in detail, it is obvious that many changes, additions, and deletions may be made in the size, shape and arrangement of the elements of the invention within the scope of the appended claims.

I claim:
1. A spherical fishing float adapted to be cast with a hook and sinker by means of a casting rod and fishing line capable of containing a winding of line at the hook end of the line and capable of unwinding the line automatically upon resting on water comprising a spherical body possessed of the inherent characteristic of being rotatable in any direction under slight influences while floating in or on water and having a first open slot penetrating one hemisphere of said body for receiving a fishing line from a casting rod sidewise therein without threading and for substantially axially positioning the line on a diameter of said body for balancing said body on a line, means in said body slot for securing the line to said body substantially on a diameter of said body, a spool on said body disposed below the peripheral surface of said body in the other hemisphere of said body so as not to interfere with said body first slot and so that windings of fish line on said spool do not interfere with said body first slot, said body having a second slot in its other hemisphere disposed at right angles to said body slot and disposed deep enough in its other hemisphere to interrupt said spool portion so that the fish line wound on said spool can be reversed in winding direction by traveling through said body second slot from one side of said spool to the other side of said spool with said body first slot being capable of receiving the hook end of said line in close parallel relation to the rod end of said line.

2. A fishing float comprising a substantially spherical body having a first slot dividing one hemisphere of said body for inserting a line to the axis of said body, a second slot at an angle to said first slot dividing the other hemisphere of said body, and a spool portion on said body for winding line thereon; said second slot providing means for reversing line winding on said spool portion.

3. In a device as set forth in claim 2, gripping means in said first slot for lineally fixing said body on the line.

WALTER P. BRZEZINSKI.

REFERENCES CITED

The following references are of record in the file of this patent:

UNITED STATES PATENTS

| Number | Name | Date |
|---|---|---|
| 755,683 | Miller | Mar. 29, 1904 |
| 1,750,842 | Hren | Mar. 18, 1930 |
| 1,883,574 | Cleeland | Oct. 18, 1932 |
| 1,918,507 | Westling | July 18, 1933 |
| 1,973,028 | Thomas | Sept. 11, 1934 |
| 2,019,630 | Peeso | Nov. 5, 1935 |
| 2,393,070 | Saloun | Jan. 15, 1946 |
| 2,413,371 | Parker | Dec. 31, 1946 |
| 2,504,241 | Wulff | Apr. 18, 1950 |